March 22, 1938. E. E. BALDWIN 2,111,956
AUTOMATIC COUPLING
Filed Jan. 27, 1937

Witness:
Burr W. Jones

INVENTOR.
Everett E. Baldwin
BY Clinton S. Jones
ATTORNEY.

Patented Mar. 22, 1938

2,111,956

UNITED STATES PATENT OFFICE 2,111,956

AUTOMATIC COUPLING

Everett E. Baldwin, Elmira, N. Y., assignor to Eclipse Machine Company, Elmira, N. Y., a corporation of New York Application January 27, 1937, Serial No. 122,599

8 Claims. (Cl. 285—169)

The present invention relates to automatic couplings and more particularly to a self-locking and self-sealing quick detachable coupling for hose adapted to convey fluids under pressure.

Various forms of quick detachable hose couplings have been developed in which the pressure of the fluid being conveyed serves to seal the joint between the parts of the coupling, and operate locking mechanism for the members of the coupling, one form of such coupling being exemplified by the disclosure in the patent to Meyer 1,754,639 in which the parts of the coupling are locked together by a contractile keying means which is forced into locking position by means operated by the pressure of the fluid transmitted, but which may be manually withdrawn when the fluid pressure is removed from the joint.

It is an object of the present invention to provide a novel quick detachable coupling of the general type described which is reliable and efficient in operation and simple and economical in construction.

It is another object to provide such a device in which the parts of the coupling are automatically locked upon bringing them together into operative relationship, and are unlocked by merely forcing them together more closely.

It is a further object to provide such a device in which the unlocking means does not interfere with the action of the locking means when the elements of the coupling are brought together.

Further objects and advantages will be apparent from the following description taken in connection with the accompanying drawing in which.

Figure 1:
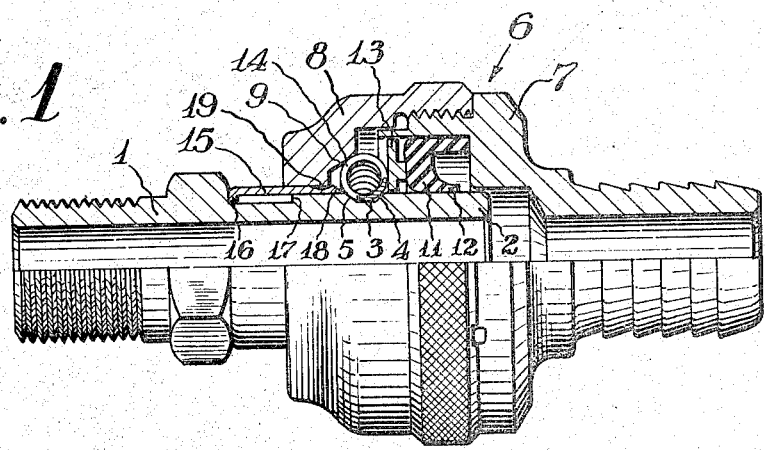
Fig. 1 is a side elevation partly in section of a preferred embodiment of the invention showing the parts in coupled and locked position.

Referring first to Fig. 1 of the drawing, there is illustrated a coupling comprising a nipple or spud member 1 having a cylindrical extension 2 provided with a circumferential groove 3 having inclined walls 4 and 5. A socket member 6 preferably formed of two interthreaded parts 7 and 8 to facilitate assembly, is adapted to receive the spud 1, and carries a contractile locking member in the form of a coiled spring member 9 which is adapted to seat in the groove 3 of the spud 1 when the coupling members are joined.

Means for sealing the joint between the coupling members 1 and 6, and for wedging the locking member 9 into its seat 3 in the spud 1 is provided comprising a flexible piston member 11 mounted in the part 7 of the coupling socket 6, having a lip 12 adapted to be forced by fluid pressure in the coupling into intimate contact with the end of the spud 1, and bearing against a thrust washer 13. Fluid pressure in the coupling serves also to actuate the piston member 11 to cause the thrust washer 13 to wedge the locking member 9 against an inclined shoulder 14 on the interior of the part 8 of the socket whereby the locking member is pressed into the groove 3 and the coupling members are thereby securely connected.

According to the present invention, a releasing member for the lock spring 9 is provided in the form of a sleeve 15 mounted on the spud 1 for sliding movement limited by the engagement of a lip 16 on the sleeve against a shoulder 17 on the spud. The sleeve 15 extends into proximity with the groove 3 when the sleeve is in its retracted position, and the outer end of the sleeve is bevelled as indicated at 18 to facilitate distention of the lock spring 9 when it is pushed out of the groove 3. A shallow groove 19 is formed in the periphery of the sleeve 15 adjacent its outer end adapted to receive the lock spring 9 and thus yieldingly connect the sleeve for longitudinal motion with the spring.

Figure 3:
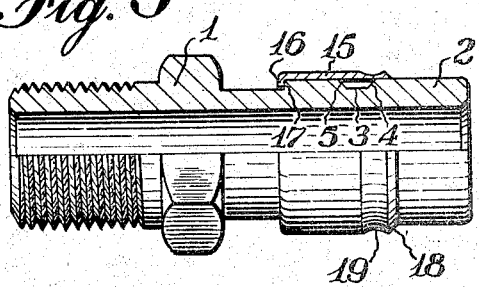
Fig. 3 is a side elevation partly in section of the nipple or spud member of the coupling.
Figure 4:
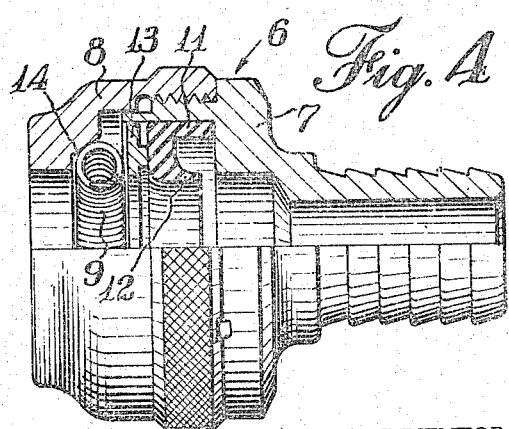
Fig. 4 is a similar view of the socket member of the coupling.

In the operation of the device, starting with the coupling members 1 and 6 separated as illustrated in Figs. 3 and 4, introduction of the spud or nipple 1 into the socket 6 causes the cylindrical portion 2 of the nipple to penetrate the sealing piston 11 until the lock spring 9 snaps into the groove 3, whereupon the parts are securely joined. Fluid pressure applied through the coupling acts on the piston 11 to seal the joint by expansion of the piston and prevent dislodgement of the lock member 9 from the groove 3 by virtue of the wedging action of the thrust washer 13 and inclined shoulder 14. It will be noted that when the coupling members are joined, the sleeve 15 slides back to its retracted position as shown in Fig. 1.

Figure 2:
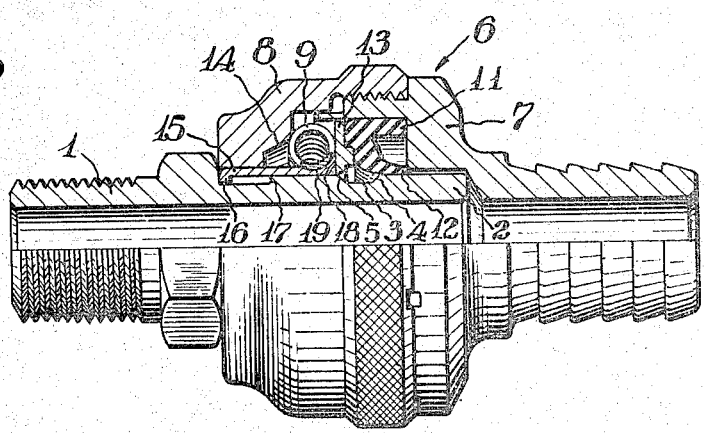
Fig. 2 is a similar view showing the parts in the positions assumed when the coupling members are unlocked by being forced together.

When it is desired to sever the coupling, the fluid pressure being removed, it is merely necessary to force the spud 1 further into the socket 6 as illustrated in Fig. 2, whereupon the thrust ring 13 causes the lock spring 9 to ride up on the sleeve 15 and seat in the groove 19 therein. This expansive action of the lock spring is permitted by the flexibility of the piston 11 which permits the socket 6 to move longitudinally sufficiently to back the inclined shoulder 14 away from the lock spring and thus permit the radial expansion thereof. When the spud or nipple 1 is then withdrawn, the sleeve 15 is initially prevented from moving therewith by reason of its yielding connection with the lock spring 9 so that the sleeve serves to bridge the groove 3 in the spud and prevent the lock spring from entering the groove. The spud 1 may thus be freely withdrawn, whereupon the parts assume their original positions as shown in Figs. 3 and 4.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In a coupling, a socket member, a spud member adapted to enter said socket, locking means including a movable element in the socket arranged to engage the spud and prevent withdrawal thereof, and means operable by movement of the spud into the socket beyond its locked position for releasing said locking means.

2. In a coupling, a socket member, a spud member adapted to enter said socket, locking means including a contractile element in the socket arranged to engage the spud and prevent withdrawal thereof, and means on said spud operable by movement of the spud into the socket beyond its normal position for distending the contractile element and holding it distended during withdrawal of the spud.

3. In an automatic coupling, a spud member having a peripheral groove, a socket member adapted to receive said spud, a locking member in said socket adapted to engage in said groove, said socket having an inclined shoulder adapted to engage the locking member and confine it in the groove, means actuated by movement of the spud into the socket beyond its normal position for moving the locking member out of the groove, and means for bridging the groove to permit removal of the spud.

4. In an automatic coupling, a spud member having a peripheral groove, a socket member adapted to receive said spud, a locking member in said socket adapted to engage in said groove, said socket having an inclined shoulder adapted to engage the locking member and confine it in the groove, and means actuated by movement of the spud into the socket beyond its normal position for moving the locking member out of the groove, said means comprising a sleeve on the spud adapted to engage the locking member and prevent its entering the groove during withdrawal of the spud.

5. In a coupling, a cylindrical spud member having a circumferential groove adjacent one end, a socket member adapted to receive the spud, a contractile locking ring in the socket adapted to seat in said groove, and a sleeve slidably mounted on the spud adapted to receive the locking member when the spud is forced into the socket beyond its normal locked position, said sleeve being arranged to be held by the locking member during the initial withdrawing movement of the spud so as to bridge the groove and thereby render the locking means inoperative.

6. In a coupling, a cylindrical spud member having a circumferential groove adjacent one end, a socket member adapted to receive the spud, a contractile locking ring in the socket adapted to seat in said groove, and a sleeve mounted on the spud for limited sliding movement relative thereto and having a shallow peripheral groove adapted to receive the locking member when the spud is forced into the socket beyond its normal locked position whereby the sleeve prevents the locking member from entering the groove in the spud during withdrawal of the spud.

7. In an automatic hose coupling, a cylindrical nipple having a circumferential groove adjacent one end, a socket member adapted to receive said nipple, a contractile locking ring carried by said socket adapted to seat in said groove, fluid-pressure operated means sealing the joint between the nipple and socket and forcing the locking ring into its seat on the nipple, and a sleeve slidably mounted on the nipple adapted to receive the locking ring when the nipple is forced into the socket beyond its normal position, and to hold the ring distended during subsequent withdrawal of the nipple.

8. A hose coupling including a nipple member and a socket member, means operative upon introduction of the nipple into the socket to automatically seal and lock said members together, and means operable by further penetration of the nipple in the socket to unlock said members substantially as shown and described.

EVERETT E. BALDWIN.